(12) United States Patent
Hisada et al.

(10) Patent No.: US 9,991,720 B2
(45) Date of Patent: Jun. 5, 2018

(54) LOAD CONTROL APPARATUS AND LOAD CONTROL SYSTEM

(71) Applicant: KABUSHIKI KAISHA TOSHIBA, Minato-ku (JP)

(72) Inventors: Nagako Hisada, Tokyo (JP); Koichi Shimozato, Kanagawa (JP); Takao Nosaka, Tokyo (JP); Kenichi Yamazaki, Saitama (JP); Saori Machida, Tokyo (JP); Koji Kimura, Kanagawa (JP); Ikuro Komamura, Tokyo (JP); Tomohiro Asazuma, Saitama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 138 days.

(21) Appl. No.: 15/035,686

(22) PCT Filed: Nov. 10, 2014

(86) PCT No.: PCT/JP2014/079729
§ 371 (c)(1),
(2) Date: May 10, 2016

(87) PCT Pub. No.: WO2015/068840
PCT Pub. Date: May 14, 2015

(65) Prior Publication Data
US 2016/0285275 A1    Sep. 29, 2016

(30) Foreign Application Priority Data

Nov. 11, 2013    (JP) .................................. 2013-232871

(51) Int. Cl.
*H02J 1/04*    (2006.01)
*H02J 4/00*    (2006.01)
(Continued)

(52) U.S. Cl.
CPC ...... *H02J 4/00* (2013.01); *H02J 3/14* (2013.01); *H02J 3/381* (2013.01); *H02J 9/06* (2013.01);
(Continued)

(58) Field of Classification Search
None
See application file for complete search history.

(56) References Cited

U.S. PATENT DOCUMENTS

| 2010/0038966 A1 | 2/2010 | Espeut, Jr. |
| 2012/0242145 A1 | 9/2012 | Espeut, Jr. |

(Continued)

FOREIGN PATENT DOCUMENTS

| JP | 3-245743 A | 11/1991 |
| JP | 4-317520 A | 11/1992 |

(Continued)

OTHER PUBLICATIONS

International Search Report dated Feb. 3, 2015 in PCT/JP14/79729 Filed Nov. 10, 2014.

(Continued)

*Primary Examiner* — Cassandra Cox
(74) *Attorney, Agent, or Firm* — Oblon, McClelland, Maier & Neustadt, L.L.P.

(57) ABSTRACT

A load control apparatus and a load control system capable of more efficiently using power generated from a private power generator, in which a load control apparatus includes a memory, a selector, and a load controller. The memory is configured to store a plurality of patterns having a plurality of control operations that are prioritized for a plurality of loads operated by consuming electric power. The selector is configured to select one of the patterns stored in the memory. The load controller is configured to operate the loads in order of priority on the basis of the control operation of the selected pattern while a total sum of power consumed by the loads does not exceed a target power value representing a value based on power suppliable by the electric generator.

6 Claims, 10 Drawing Sheets

(51) Int. Cl.
*H02J 3/14* (2006.01)
*H02J 3/38* (2006.01)
*H02J 9/06* (2006.01)

(52) U.S. Cl.
CPC ..... *H02J 2003/143* (2013.01); *Y02B 70/3225* (2013.01); *Y02B 70/3266* (2013.01); *Y02B 70/3291* (2013.01); *Y04S 20/222* (2013.01); *Y04S 20/242* (2013.01); *Y04S 20/248* (2013.01)

(56) References Cited

U.S. PATENT DOCUMENTS

| | | |
|---|---|---|
| 2013/0187462 A1 | 7/2013 | Lim et al. |
| 2013/0270908 A1 | 10/2013 | Wedel et al. |
| 2014/0235403 A1* | 8/2014 | Gilbert .............. B60W 30/1888 477/36 |

FOREIGN PATENT DOCUMENTS

| | | |
|---|---|---|
| JP | 6-197450 A | 7/1994 |
| JP | 6-335171 A | 12/1994 |
| JP | 9-285016 A | 10/1997 |
| JP | 2005-261050 A | 9/2005 |
| JP | 2007-236023 A | 9/2007 |
| JP | 2013-228833 A | 11/2013 |

OTHER PUBLICATIONS

Extended European Search Report dated Jun. 27, 2017 in Patent Application No. 14860190.9.

* cited by examiner

FIG. 3

| NUMBER | PRIORITY | CONTROL TARGET | CAPACITY[kW] | EXCLUDED | TOTAL CAPACITY[kW] |
|---|---|---|---|---|---|
| 1 | 1 | TURN ON LIGHT OF 1st FLOOR A | 20 | | 42 |
| 2 | 1 | TURN ON LIGHT OF 1st FLOOR B | 22 | | 42 |
| 3 | 2 | TURN ON AIR CONDITIONER OF 1st FLOOR A | 60 | | 60 |
| 4 | 2 | TURN ON AIR CONDITIONER OF 1st FLOOR B | 55 | EXCLUDED | 60 |
| 5 | 3 | SET TEMPERATURE OF AIR CONDITIONER OF 1st FLOOR A | 0 | | 0 |
| ⋮ | ⋮ | ⋮ | ⋮ | ⋮ | ⋮ |

FIG. 4

| LOAD ID | LOAD STATE VALUE |
|---|---|
| 1001 | ON |
| 1002 | OFF |
| 1003 | OFF |
| 1004 | ON, COOLING, STRONG |
| 1005 | OFF |
| ⋮ | ⋮ |

FIG. 11

PATTERN SETTING

SETTING IS NOT ALLOWED DURING START OF CONTROL

SELECT PATTERN [▽] PATTERN [1] [△]   NAME OF PATTERN [FACILITIES OF B1F TO 2F]

TOTAL LOAD CAPACITY OF PATTERN 897.4kW

| No. | LEVEL | NAME OF LOAD | STATUS | SETTING VALUE | CAPACITY [kW] | EXCLUDED | CHANGE STATUS | TOTAL [kW] |
|---|---|---|---|---|---|---|---|---|
| 1 | 1 | ACP-1-A-a_TEMPERATURE SETTING | ○ | □ | 0.0 | | | 35.8 |
| 2 | 1 | ACP-1-B-a_TEMPERATURE SETTING | ○ | □ | 0.0 | | | 35.8 |
| 3 | 1 | ACP-1-A-a_LIGHT ON | ○ | | 20.0 | | | 35.8 |
| 4 | 1 | ACP-1-B-a_LIGHT ON | ○ | | 22.0 | EXCLUDED | | 35.8 |
| 5 | 1 | ACP-MDF-A-a_LIGHT ON | ○ | | 15.8 | | | 35.8 |
| 6 | 1 | ACP-1-A-a_ILLUMINANCE SETTING | ○ | ◇ | 0.0 | | SKIP | 35.8 |
| 7 | 2 | ACP-1-B-c_LIGHT ON | ○ | | 15.0 | | | 15.0 |
| 8 | 3 | ACP-1-C-a_LIGHT ON | ○ | | 15.0 | | | 15.0 |
| 9 | 4 | ACP-1-C-d_LIGHT ON | ○ | | 35.0 | | | 35.0 |
| 10 | 5 | ACP-1-C-e_LIGHT ON | ○ | | 25.0 | | | 25.0 |
| 11 | 6 | ACP-1-A-b_LIGHT ON | ○ | | 50.0 | | | 50.0 |
| 12 | 7 | ACP-1-Ad-a_LIGHT ON | ○ | | 60.0 | | | 60.0 |
| 13 | 8 | ACP-1-Ad-b_LIGHT ON | ○ | | 55.0 | | | 55.0 |
| 14 | 9 | ACP-1-B-b_LIGHT ON | ○ | | 50.0 | | | 50.0 |
| 15 | 10 | ACP-1-B-d_LIGHT ON | ○ | | 99.6 | | | 99.6 |

[NEW REGISTRATION] [CHANGE] [DELETE]   [CANCEL]

US 9,991,720 B2

LOAD CONTROL APPARATUS AND LOAD CONTROL SYSTEM

TECHNICAL FIELD

The embodiments of the present invention relate to a load control apparatus and a load control system.

BACKGROUND ART

In the prior art, techniques of stably and continuously supplying electricity to loads in the event of a power failure have been proposed (for example, see Patent Literature 1). A business continuity plan (BCP) control is one of such techniques.

The BCP control is one of control methods for supplying electricity to a plurality of loads from an in-house electric generator for a non-commercial power supply (hereinafter, referred to as a "private power generator") when electric power supplied from an electric power company is interrupted due to a power failure and the like. The BCP control is a control for supplying energy to a variety of loads for a long time by efficiently and fully using the electric power generated from the private power generator to accommodate continuous business activities.

CITATION LIST

Patent Literature

[Patent Literature 1]
Japanese Unexamined Patent Application, First Publication No. H09-285016

SUMMARY OF INVENTION

Issue to be Solved by the Invention

However, in the BCP control, there are still demands for a technique for optimized and efficient electric power management.

An object of the present invention is to provide a load control apparatus and a load control system capable of more efficiently using electric power generated from a private power generator.

Means for Solving the Issue

A load control apparatus according to an embodiment includes a memory, a selector, and a load controller. The memory is configured to store a plurality of patterns having a plurality of control operations that are prioritized for a plurality of loads operated by consuming power. The selector is configured to select one of the patterns stored in the memory. The load controller is configured to operate the loads in order of priority on the basis of the control operations of the selected pattern while a total sum of power consumed by the loads does not exceed a target power value representing a value based on the power suppliable by the electric generator.

BRIEF DESCRIPTION OF DRAWINGS

FIG. 3 is a diagram illustrating a specific example of information stored in a pattern memory (404).

FIG. 4 is a diagram illustrating a specific example of information stored in a state memory (407).

FIG. 11 is a diagram illustrating a specific example of a pattern setting dialog box displayed on the display (402).

DESCRIPTIONS OF EMBODIMENTS

[Overview]

In a load control apparatus and a load control system (each of which will be hereinafter referred to as a "load control apparatus" in this overview) according to an embodiment, a single or a plurality of load control patterns are registered in advance. The load control pattern is information regarding the control operations of the loads set for each of a plurality of priorities (BCP control levels). In the load control apparatus, when the BCP control is performed, a load control is executed on the basis of the load control pattern selected by an operator. Specifically, the control is performed as follows.

In the load control apparatus, the control operations, each of which has its own priority, are referenced sequentially in the order of the priorities. Power consumed by executing the referenced control operation (setting power) is compared with surplus power of the private power generator (BCP adjustment power). If the consumed power is lower than the surplus power of the private power generator, each load is controlled newly on the basis of the corresponding control operation. In contrast, if the consumed power is higher than the surplus power of the private power generator, the control based on the corresponding control operation is not performed. For this reason, it is possible to operate the loads sequentially in order of priority within a range of power generable by the private power generator. Therefore, it is possible to more efficiently use the power generated from the private power generator.

A load control apparatus and a load control system according to an embodiment will now be described in more detail.

DETAILED DESCRIPTION

Figure 1:
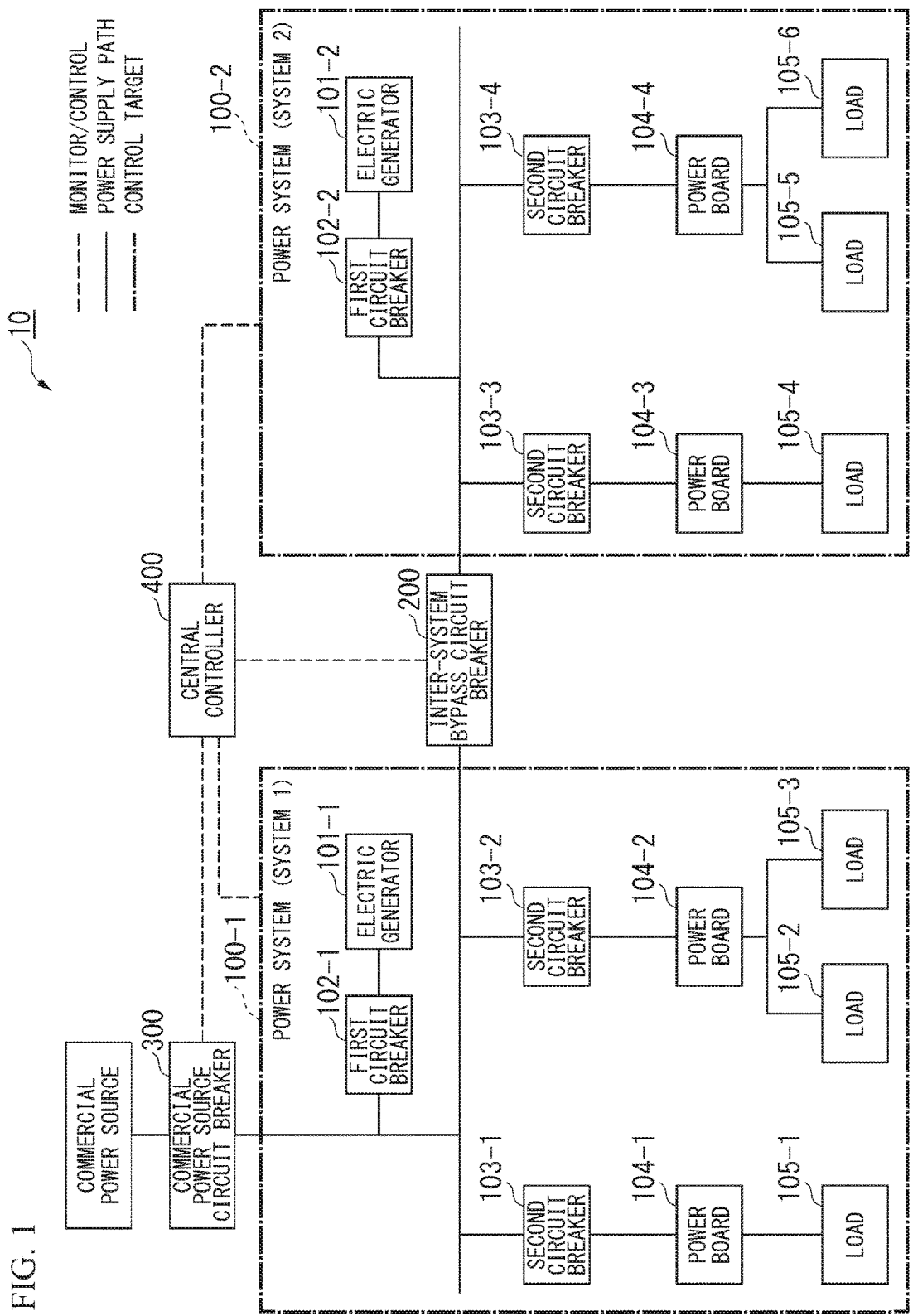
FIG. 1 is a diagram illustrating a system configuration of a load control system (10) according to an embodiment of the invention.

FIG. 1 is a diagram illustrating a system configuration of the load control system (10) according to an embodiment of the invention. In FIG. 1, a communication line for monitoring and control operations is denoted by a dotted line, a path for supplying electric power is denoted by a solid line, and each electric power system as a control target is denoted by a one-dotted chain line. The load control system 10 according to an embodiment of the invention is installed in a single or a plurality of facilities or buildings. The load control system 10 includes a plurality of electric power systems 100 (electric power systems 100-1 and 100-2), an inter-system bypass circuit breaker 200, a commercial power circuit breaker 300, and a central controller 400. The load control system 10 according to an embodiment of the invention illustrated in FIG. 1 includes an electric power system 100-1 (system 1) and an electric power system 100-2 (system 2). Components common to the electric power systems 100-1 and 100-2 will now be described.

The electric power system 100 includes an electric generator 101, a first circuit breaker 102, a second circuit breaker 103, a power board 104, and loads 105.

The electric generator 101 is an in-house electric generator (private power generator) configured to generate electric power supplied to the loads 105.

The first circuit breaker 102 is a circuit breaker for controlling whether or not the electric power generated by the electric generator 101 is supplied to power lines (bus lines) connected to the second circuit breaker 103 and the inter-system bypass circuit breaker 200. The first circuit breaker 102 includes a high-pressure circuit breaker such as a vacuum circuit breaker (VCB) or a gas circuit breaker (GCB).

The second circuit breaker 103 is a circuit breaker for controlling whether or not the electric power supplied from the electric generator 101 is supplied to the power board 104 and the loads 105 via the first circuit breaker 102. The second circuit breaker 103 includes a high-pressure circuit breaker such as a vacuum circuit breaker (VCB) or a gas circuit breaker (GCB).

The power board 104 is a unit for controlling whether or not the electric power is supplied to each of one or more of the plurality of loads 105. An operator may manipulate the power board 104 to control the electric power supplied to the loads 105. An operator may manipulate the power board 104 either directly or from a remote site.

The load 105 is a unit operated by consuming electric power supplied by using the power board 104. The load 105 includes, for example, an air conditioner, a heating system, an indoor air-conditioning unit, an outdoor air-conditioning unit, lighting facilities, security facilities, communication facilities, building control facilities, elevator facilities, and the like. A state of the load 105 changes depending on a control of a central monitoring unit (not illustrated). For example, assuming that the load 105 is an indoor air-conditioning unit, the load 105 receives a control request for power on/off, a setting temperature, an airflow intensity, and the like, and is operated in response to the received control request. In addition, the load 105 receives the manipulation of an operator or a user and is operated in response to the received manipulation.

The number of components such as the electric generator 101, the first circuit breaker 102, the second circuit breaker 103, the power board 104, and the loads 105 provided in the electric power system 100 may each be singular or plural. In addition, other components different from the electric generator 101, the first circuit breaker 102, the second circuit breaker 103, the power board 104, and the load 105 may also be provided in the electric power system 100.

The inter-system bypass circuit breaker 200 is a circuit breaker for shutting off a power line (bus line) used to connect a plurality of electric power systems 100. The inter-system bypass circuit breaker 200 includes a high-pressure circuit breaker such as a vacuum circuit breaker or a gas circuit breaker. When electric power is supplied from a commercial power source, the inter-system bypass circuit breaker 200 is closed to supply electric power to each electric power system 100 from the commercial power source. In contrast, when electric power is supplied from the electric generator 101, the central controller 400 may open the inter-system bypass circuit breaker 200 as necessary.

The commercial power circuit breaker 300 is a circuit breaker for controlling whether or of the electric power from the commercial power source is supplied to the power line. The commercial power circuit breaker 300 includes a high-pressure circuit breaker such as a vacuum circuit breaker or a gas circuit breaker.

The central controller 400 controls units in a plurality of electric power systems 100 provided in the load control system 10, the inter-system bypass circuit breaker 200, and the commercial power circuit breaker 300. The central controller 400 includes an information processing device such as a server.

Figure 2:
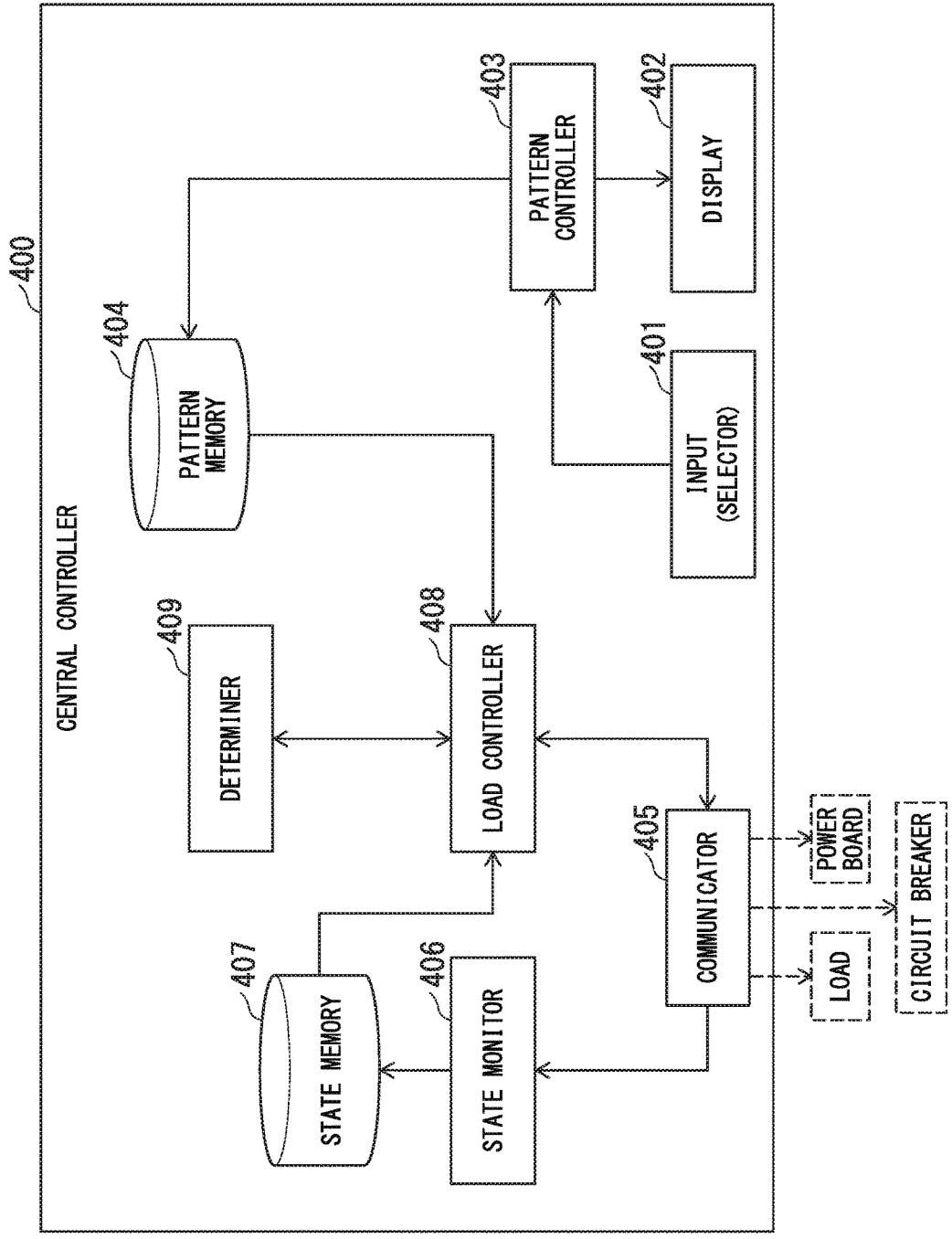
FIG. 2 is a functional block diagram illustrating a functional configuration of a central controller (400).

FIG. 2 is a functional block diagram illustrating a functional configuration of the central controller 400. The central controller 400 includes an input 401, a display 402, a pattern controller 403, a pattern memory 404, a communicator 405, a state monitor 406, a state memory 407, a load controller 408 and a determiner 409. The pattern controller 403, the state monitor 406, the load controller 408, and the determiner 409 are implemented by executing a central control program in a central processing unit (CPU). It should be noted that the pattern controller 403, the state monitor 406, the load controller 408, and the determiner 409 may be implemented entirely or partially using hardware such as an application specific integrated circuit (ASIC), a programmable logic device (PLD), or a field programmable gate array (FPGA). The central control program may be recorded on a computer-readable recording medium. The computer-readable recording medium includes a memory device such as a flexible disk, an optical magnetic disk, a read-only memory (ROM), a portable medium such as CD-ROM, a hard disk embedded in a computer system. The central control program may be transmitted via an electric communication line.

The input 401 includes a conventional input device such as a keyboard, a pointing device (mouse or tablet), a button, or a touch panel. The input 401 is manipulated by an operator to input an operator's instruction to the central controller 400. The input 401 may be an interface for connecting an input device to the central controller 400. In this case, the input 401 inputs, to the central controller 400, an input signal generated in response to an operator's input using the input device.

The display 402 is an image display device such as a cathode ray tube (CRT) display, a liquid crystal display, or an organic electro-luminescence (EL) display. The display 402 displays text or images. The display 402 may be an interface for connecting the image display device to the central controller 400. In this case, the display 402 generates an image signal for displaying text or images and outputs the image signal to an image display device connected thereto.

The pattern controller 403 receives a load control pattern created by an operator in response to an instruction input by an operator through the manipulation of the input device. The pattern controller 403 writes the received load control pattern to the pattern memory 404.

The pattern memory 404 includes a memory device such as a magnetic hard disk device or a semiconductor memory device. The pattern memory 404 stores the load control pattern received by the pattern controller 403.

FIG. 3 is a diagram illustrating a specific example of the information stored in the pattern memory 404. The pattern memory 404 stores pattern tables 41 for each load control pattern. For this reason, the pattern memory 404 stores as many pattern tables 41 as the number of the load control patterns. A single pattern table 41 indicates the content of a single load control pattern.

A plurality of records 42 are registered in the pattern table 41. The record 42 contains a priority and a control operation of the load. The record 42 contains each value of number, priority, control target, capacity, excluded, and total capacity (setting power).

"Number" refers to a number uniquely indicating the record in a single pattern table 41.

"Priority" indicates a priority (BCP control level) of the control operation for the load defined in the corresponding record 42. The smaller value of priority indicates a higher priority, and the greater value of priority indicates a lower priority.

"Control target" indicates a name of the load 105 to be controlled.

"Capacity" indicates the amount of electric power consumed by executing the control operation defined for the control target.

"Excluded" is a value indicating whether or not the control operation defined for the corresponding record 42 is executed. If "excluded" is set at the value of the entry "excluded", the control operation defined for the corresponding record 42 is not executed.

"Total capacity" indicates a total amount of power consumed when the control operation having a priority defined for the corresponding record 42 is entirely executed (except for the excluded control operation). For example, a total capacity of the priority set to "1" is a sum of the capacity of the record No. 1 and the capacity of the record No. 2. For example, a total capacity of the priority set to "2" is the same as the capacity of the record No. 3 because "excluded" is set in the record No. 4.

Returning to FIG. 2, the description of the central controller 400 will be continued. The communicator 405 is a network interface. The communicator 405 communicates with, for example, each unit of the electric power system 100 or the intersystem bypass circuit breaker 200. For example, the communicator 405 receives a value indicating a state of the load 105 (hereinafter, referred to as a "load state value") from the load 105 or a sensor (not shown). In addition, the communicator 405 transmits control signals generated by the load controller 408 to the first circuit breaker 102, the second circuit breaker 103, the power board 104, and the load 105 as control targets of the load controller 408.

The state monitor 406 monitors states of each load 105 on the basis of the load state value received by the communicator 405 during a normal control operation (before a power failure occurs). When the state of the load 105 changes, the state monitor 406 writes the changed load state value to the state memory 407. The state monitor 406 does not update the load state value until a power failure is restored after the power failure occurs. For this reason, after a power failure occurs, a load state value indicating a state of each load 105 immediately before the power failure is written to the state memory 407.

The state memory 407 includes a memory device such as a magnetic hard disk device or a semiconductor memory device. The state memory 407 stores the load state value written by the state monitor 406.

FIG. 4 is a diagram illustrating a specific example of the information stored in the state memory 407. The state memory 407 stores a state information table 71.

A plurality of records 72 are registered in the state information table 71. The record 72 contains a load identification (ID) and each load state value. The load ID is identification information uniquely representing the load 105. The load state value is information regarding a state of the load 105 designated by the load ID of the corresponding record 72.

Returning to FIG. 2, the description of the central controller 400 will be continued. The load controller 408 controls the load 105 on the basis of the load control pattern stored in the pattern memory 404 and the determination result of the determiner 409.

For example, the load controller 408 determines control operation for each load 105 on the basis of the load control pattern and generates control signals representing the determined control operation. In addition, the load controller 408 transmits the control signals to each load 105 via the communicator 405.

The load controller 408 may control each load 105 depending on the load state value of each load 105 registered in the state information table 71. For example, the load controller 408 executes control only for the load 105 registered as being controlled in the state information table 71 out of the control operation for the load defined in the load control pattern.

Until restoration after a power failure (during execution of the BCP control), the load controller 408 controls the load 105 such that each load 105 is not controlled by other units such as the central monitoring unit. As a result of such a control, it is possible to suppress the control of the load controller 408 from being disturbed by controls of other units (for example, a control may be executed for the lower priority, or the currently generated power may exceed the BCP target power).

The determiner 409 determines whether or not control operations of the lower priority are to be executed. The determiner 409 outputs the determination result to the load controller 408.

Next, an execution process of the load controller 408 will be described in detail. The execution process of the load controller 408 includes a process of determining whether or not the BCP control starts and a process of determining any system excluded from the BCP control target. Each process will now be described.

First, the process of determining whether or not the BCP control starts will be described. A condition for starting the BCP control (control condition) is set in the load controller 408 in advance. The load controller 408 determines whether or not the control condition is satisfied. The load controller 408 starts the BCP control when it is determined that the control condition is satisfied.

As the control condition, for example, the following condition may be set for each electric power system 100.
  The electric generator 101 should be in operation, and the electric power system 100 should be a transmission system as well as a private power generator.
  One or more electric generators 101 satisfying the operable condition should belong to the corresponding electric power system 100.
  An instruction for starting the BCP control should be completed manually by an operator.
  The operable condition of the electric generator 101 may include a plurality of conditions for indicating that the electric generator 101 is operated normally without a worry about a failure. For example, a plurality of indices for showing a state of the electric generator 101 or a plurality of indices for indicating whether or not the electric generator 101 has failed may be set as the operable condition. For example, it may be determined that the electric generator 101 does not satisfy the operable condition if any one of the plurality of operable conditions is not satisfied.

Next, a process of determining a system excluded from the BCP control target will be described. When there is an electric power system 100 that does not satisfy the aforementioned control condition, the load controller 408 interrupts the BCP control of the electric power system 100 that does not satisfy the control condition in the middle of execution of the BCP control. In this case, the load controller 408 executes only control operation having a priority set to "0" for the electric power system 100 that does not satisfy the control condition and stops execution of the control operations having priorities set to "1" and lower. In addition, the load controller 408 notifies an operator or a user that the control condition is not satisfied. It should be noted that the control may not be performed for a setting value output.

Even when an electric power system 100 once failing to satisfy the control condition satisfies the control condition later, the load controller 408 does not resume the BCP control for the corresponding electric power system 100.

Figure 5:
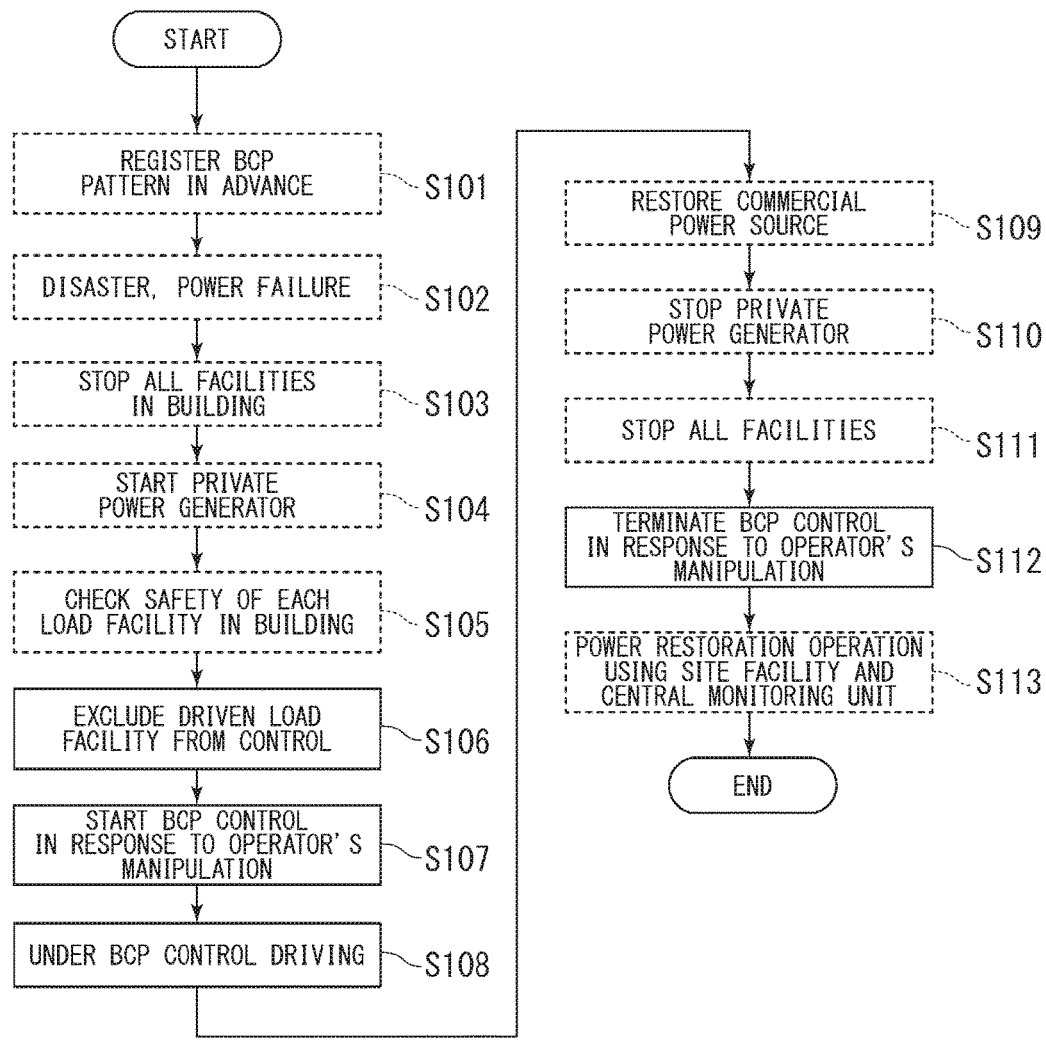
FIG. 5 is a flowchart illustrating a flow of a BCP control process in the load control system (10).

FIG. 5 is a flowchart illustrating a flow of the BCP control process in the load control system 10. It should be noted that the BCP control process also includes processes performed by an operator or device other than the central controller 400 as a main component. Such processes are illustrated as broken line rectangles in FIG. 5.

First, a process until h BCP control starts (steps S101 to S108) will be described.

An operator of the load control system 10 registers the load control pattern (BCP pattern) in the central controller 400 in advance (step S101). If a power failure occurs in the commercial power source due to a disaster and the like (step S102), all facilities (all loads 105) in the building designated as a control target of the load control system 10 are stopped (step S103). Then, in response to a power failure occurring in the commercial power source, the electric generator 101 of the electric power system 100 starts to operate (step S104).

An operator performs a safety check for the loads 105 installed in the building designated as a control target of the load control system 10 (step S105). For example, an operator performs a check regarding whether or not there is a problem (failure) if each load 105 starts to operate on the basis of a manual preset for an accident such as a disaster. When it is checked that there is a load 105 that should not start to operate (hereinafter, referred to as a "failed load"), an operator performs the manipulation for excluding the failed load from the control target of the load control system 10. In response to this manipulation, the central controller 400 sets a value "EXCLUDED" in the record 42 to indicate a failed load in the pattern table 41 (step S106).

An operator starts the electric generator 101 (step S104) after a power failure occurs (step S102). Then, the safety of each load 105 in the building is checked (step S105), a failed load is excluded as necessary (step S106), and the central controller 400 is instructed to start the BCP control. In this case, an operator selects one of a plurality of load control patterns registered for the central controller 400 in advance. In addition, an operator instructs the central controller 400 on the selected load control pattern. In response to the operator's instruction, the central controller 400 starts the BCP control based on the selected load control pattern (step S107). Furthermore, each load 105 provided in the load control system 10 is operated on the basis of the BCP control using the central controller 400 (step S108).

The supply of power to the loads 105 depends on a power failure operation pattern in the power receiving/transforming system side until the electric generator 101 starts to operate, and each of the first circuit breakers 102 is reclosed after each of the second circuit breakers 103 is opened by a power failure. This power failure operation pattern also includes a manual start operation of the private power generator. In addition, through a site check, an operator may determine that operation is not allowed even for a load 105 for which an abnormality alarm is not issued from the central monitoring unit and the like. For this reason, it is desirable to perform a site check for the state of the load 105 before the BCP start manipulation (step S107). However, the BCP control may start before a part or all of the loads 105 are operated or after all of the loads 105 are operated.

Next, a process performed after BCP control starts until restoration (step S109 to S113) will be described.

If the supply of power from a commercial power source is restored (step S109) after the BCP control starts, the electric generator 101 stops in response to the restoration of the commercial power source (step S110). Then, the first circuit breaker 102 is opened, and all loads 105 are stopped (step S111). An operator instructs the central controller 400 to terminate the BCP control. In response to the operator's instruction, the central controller 400 terminates the BCP control (step S112). Then, an operator performs a task of restoring the loads 105 to their normal operations by manipulating the loads 105 of the site facilities or the central monitoring unit (step S113). The central monitoring unit is a device for controlling a single or a plurality of loads 105. Then, a power restoration operation is performed with a condition given by the site facilities or the central monitoring unit, and a series of processes relating to the BCP control are terminated.

Figure 6:
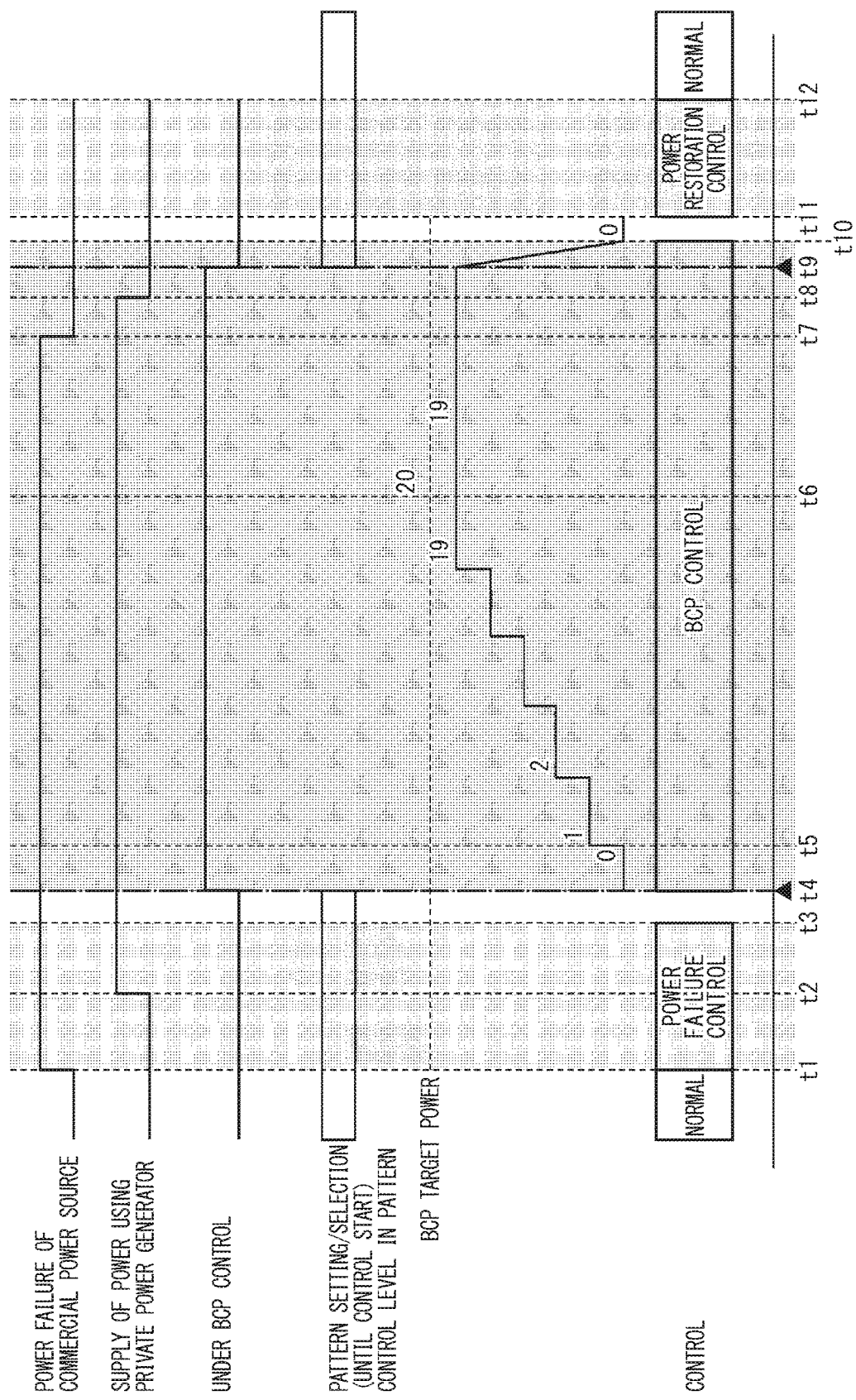
FIG. 6 is a diagram illustrating a characteristic of the BCP control in the load control system (10).

FIG. 6 is a diagram illustrating a characteristic of the BCP control in the load control system 10. In FIG. 6, the abscissa denotes time. Until the time t1, a power failure does not occur in the commercial power source. For this reason, each load 105 of the load control system 10 is operated by using the power supplied from the commercial power source. In this case, the load control system 10 performs normal control.

At the time t1, a power failure occurs in the commercial power source (S102 in FIG. 5). When a power failure occurs in the commercial power source, the load control system 10 performs power failure control. Specifically, first, all systems in the building as a control target of the load control system 10 (all loads 105) are stopped (S103 in FIG. 5). Then, at the time t2, the electric generator 101 starts to operate so that electricity can be fed from the electric generator 101 (S104 in FIG. 5). In addition, an operator performs a safety check for the loads 105 and excludes a failed load as necessary (S105 and S106 in FIG. 5). If this process is completed, the power failure control is terminated at the time t3.

When an operator instructs the central controller 400 to start the BCP control, the BCP control starts at the time t4 (S107 in FIG. 5). As the BCP control starts, power is first supplied to an emergency load. The emergency load refers to power necessary to operate a load 105 which has the top priority of being required to operate in the event of emergency out of the loads 105 provided in the building as a control target of the load control system 10. In FIG. 6, the priority designated to the emergency load is set to "0" which indicates the top priority.

Next, at the time t5, the central controller 400 determines whether or not the control operation having a priority set to "1" is to be executed. The central controller 400 compares power (setting power) consumed when the control operation having a priority set to "1" is executed and surplus power (BCP adjustment power) of the electric generator 101. If the consumed power is lower than the surplus power of the electric generator 101, the central controller 400 starts the control of each load on the basis of the control operation having a priority set to "1". The central controller 400 performs the determination process sequentially in the order of priorities "2", "3", . . . , and so on until the control operation having a priority set to "19".

Next, at the time t6, the central controller 400 determines whether or not the control operation having a priority set to "20" is to be executed. The power (setting power) consumed when the control operation having a priority set to "20" is executed is higher than the surplus power (BCP adjustment power) of the electric generator 101. That is, the power consumed when all of the control operations having priorities set to "1" to "20" are executed is higher than the target power (BCP target power) that can be supplied by the electric generator 101. For this reason, the central controller 400 does not execute the control operation having a priority set to "20".

At the time t7, the commercial power source is restored (S109 in FIG. 5). In response to the restoration of the commercial power source, at the time t8, the electric generator 101 is stopped (S110 in FIG. 5). Then, at the time t9, the central controller 400 stops supply of power to all loads 105 by opening all circuit breakers (including circuit breakers connected to the power line of the commercial power source and circuit breakers connected to the power line of the electric generator 101). In response to the stoppage of the supply of power, all loads 105 are stopped (S111 in FIG. 5).

Then, at the time t9, an operator instructs the central controller 400 to terminate the BCP control. In response to the operator's instruction, the central controller 400 sets the priority of the control operation to "0" and terminates the BCP control at the time t10 (S112 in FIG. 5).

Then, at the time t11, the power restoration control starts. In the power restoration control, an operator performs a task of restoring the loads 105 to their not mat operation states by manipulating the load 105 of a site facility or the central monitoring unit (S113 in FIG. 5). After the time t12, each load 105 of the load control system 10 is normally operated using the power supplied from the commercial power source.

Figure 7:
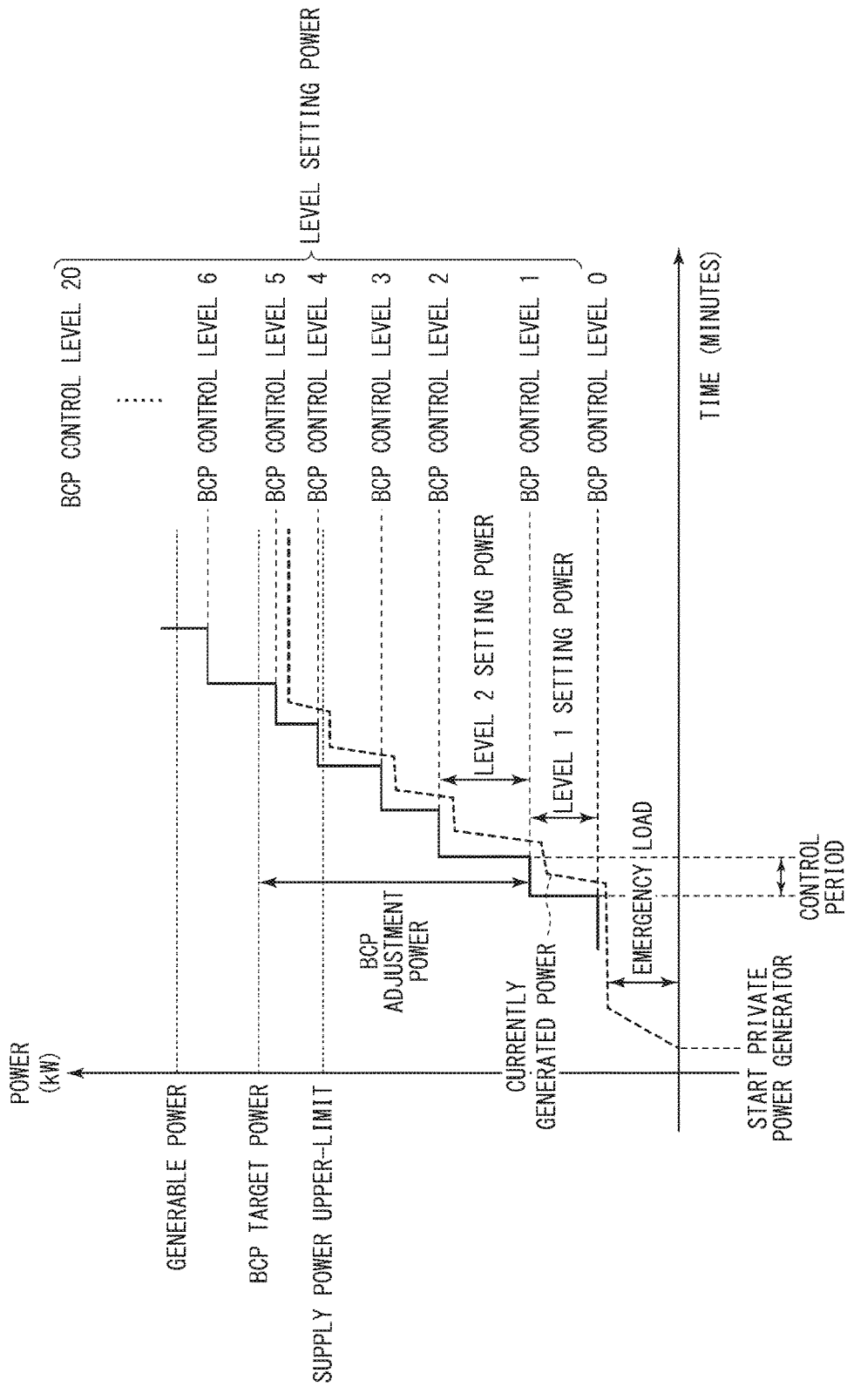
FIG. 7 is a diagram illustrating details of processing at the BCP control a point and the level control execution time point.

FIG. 7 is a diagram illustrating details of the processing performed at the BCP control start time point and the level control executing time point. First, each value in FIG. 7 will be described.

"Generable power" is a total amount of power that can be generated by the electric generators 101 satisfying the control conditions for each system. The generable power is set by an operator. For example, assuming that four electric generators 101 are operated in a single system, the generable power of this system corresponds to a total sum of the power generable by the four electric generators 101.

"Currently generated power" indicated by the dotted line is a total amount of power that are being generated by the electric generators 101 satisfying the control conditions for each system. For example, assuming that four electric generators 101 are operated in a single system, the currently generated power of this system corresponds to a total sum of power generated by the four electric generators 101. The currently generated power changes depending on the control operation (such as operation or stop) of the load 105. In other words, the currently generated power is a total sum of power supplied to the loads 105 (consumed by the loads 105) for each system.

"BCP target power" refers to a target value of the power that can be supplied by the electric generator 101. For example, the BCP target power is obtained on the basis of the following formula.

$$\text{BCP target power} = (gW - elW) \times dfr/100)) \times ((100 - lvr)/100) \quad \text{(Formula 1)}$$

In Formula 1, "gW" denotes the generable power, "elW" denotes a capacity of the emergency load, "lvr" denotes an instantaneous leveling coefficient for the load start operation, and "dfr" denotes a demand coefficient for the BCP control.

"Supply power upper-limit" is obtained on the basis of a supply power upper-limit percentage (%) and the BCP target power. The supply power upper-limit is set on the basis of the number of the registered BCP control levels and a total capacity (setting power) of each BCP control level. Specifically, when the BCP control level is incremented by one (when the control for a priority lower by one is executed), the supply power upper-limit is set within a range not exceeding the BCP target power. For example, the supply power upper-limit is obtained on the basis of the following formula.

$$\text{Supply power upper-limit} = \text{BCP target power} \times \text{Supply power upper-limit percentage} \quad \text{(Formula 2)}$$

When the currently generated power is lower than the supply power upper-limit and satisfies the supply condition, a process of incrementing the BCP control level by one (process of executing a control having a priority lower by one) is executed. It should be noted that the supply power upper-limit percentage may be set by an operator.

"BCP adjustment power" refers to power (adjustment power) that can be supplied to the loads 105. The BCP adjustment power is obtained on the basis of the following formula.

$$\text{BCP adjustment power} = \text{BCP target power} - \text{Currently generated power} \quad \text{(Formula 3)}$$

"Level setting power" is a total sum of capacities (total capacity) of the loads 105 in each BCP control level (for example, 1 to 20) of the BCP control pattern selected by an operator. A level "n" setting power (where "n" denotes an integer equal to or greater than zero) refers to a total sum of capacities of the loads 105 at the BCP control level "n".

Next, a flow of the BCP control will be described.

If the control condition of the BCP control is satisfied, the BCP control starts. The BCP control level is set to "0" when the BCP control starts. That is, when the BCP control starts, the load control is executed such that only the emergency load is operated. Then, the BCP control level repeatedly changes depending on a control period (for example, one minute) such that the BCP control level is positioned between the BCP target power and the supply power upper-limit on the basis of the control pattern selected at the time of the BCP control start manipulation.

If the currently generated power is lower than the supply power upper-limit, and the BCP adjustment power is higher than the setting power of the BCP control level higher than the current BCP control level by one, the central controller 400 executes the BCP control level incremented by one. In this case, the central controller 400 starts the control of the load 105 depending on the control target of the newly executed BCP control level. Further, the central controller 400 increments the BCP control level one by one within a control period.

Figure 8:
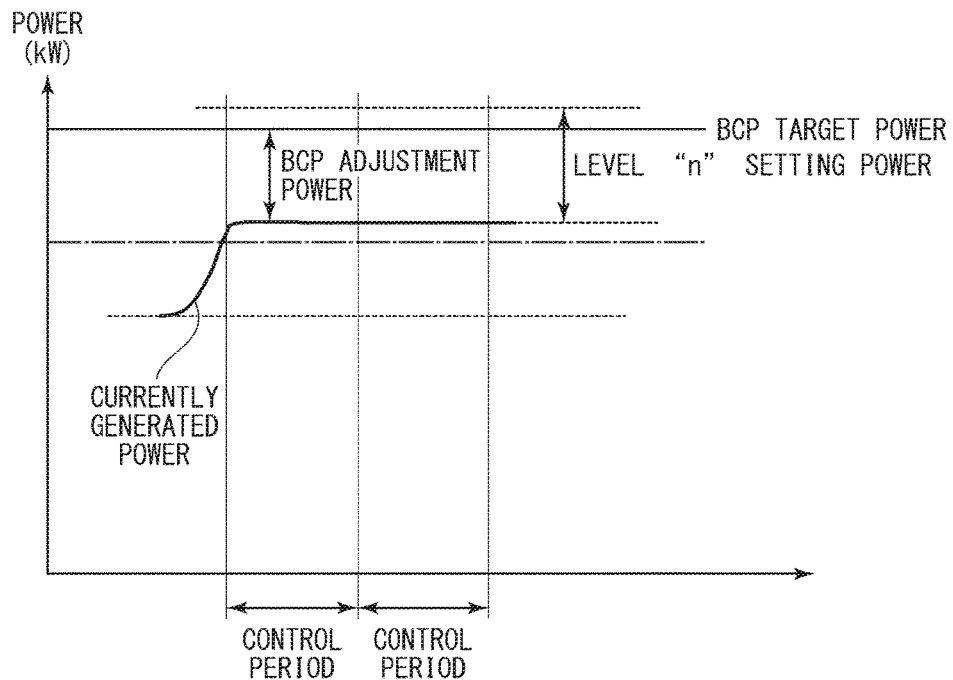
FIG. 8 is a diagram illustrating a specific example of a case where the BCP control level does not increase under a supply condition.

FIG. 8 is a diagram illustrating a specific example of a case where the BCP control level is not incremented under the supply condition. If the BCP adjustment power is higher than the setting power "n" setting power) of the BCP control level higher than the currently executed BCP control level by one, the central controller 400 does not increment the BCP control level.

Figure 9:
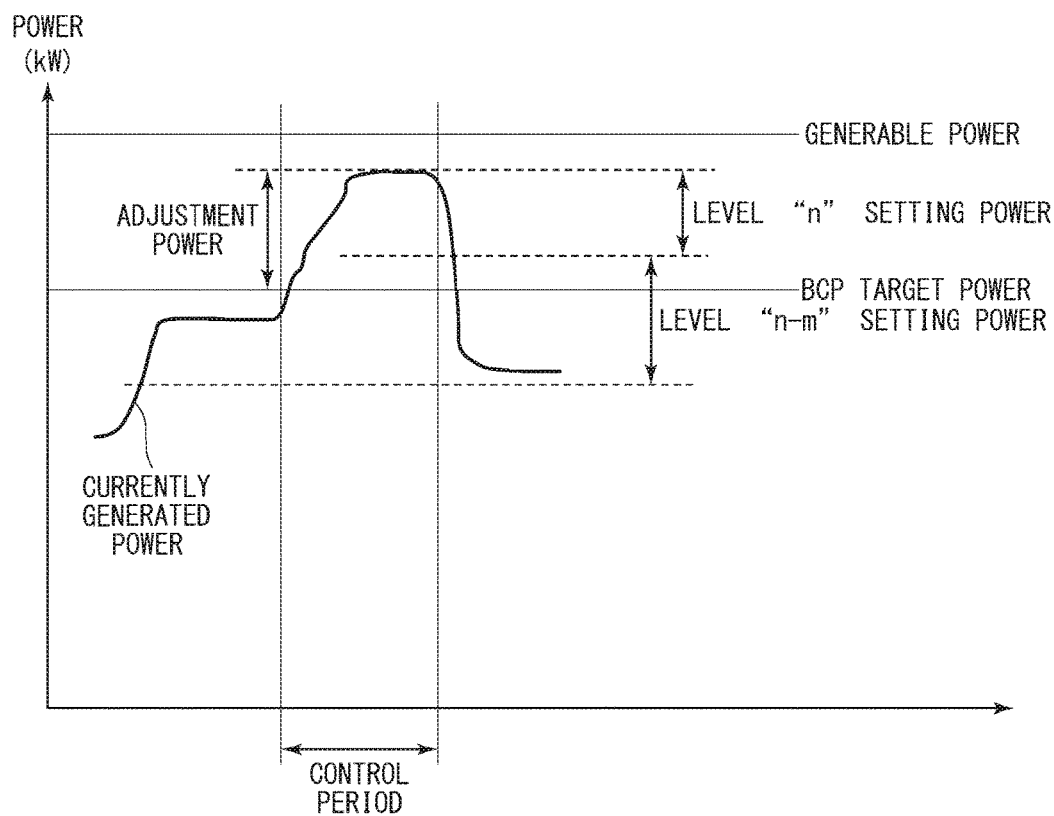
FIG. 9 is a diagram illustrating a specific example of a shut-off condition.

FIG. 9 is a diagram illustrating a specific example of a shut-off condition. If the currently generated power is higher than the BCP target power, the central controller 400 decreases the BCP control level. In this case, unlike a case where the BCP control level is incremented, the central controller 400 does not decrement the BCP control level one by one, but decreases the BCP control level at one time to the BCP control level at which the currently generated power is lower than the BCP target power. In the example of FIG. 9, the BCP control level decreases by "m" levels at one time. Further, if the control condition is not satisfied, the central controller 400 decreases the BCP control level to "0" at one time.

When a control of the load is executed differently from the currently executed load control pattern in response to an operator's or user's manipulation (hereinafter, referred to as a "user control"), the central controller 400 computes the currently generated power including a capacity of the power consumed by the user control. If the computed currently generated power is higher than the BCP target power, the central controller 400 decreases the currently generated power to the BCP target power or lower by stopping other controls while the user control continues. Specifically, the central controller 400 decreases the currently generated power as follows.

The central controller 400 determines whether or not the same control as the user control is included in the control operation of the BCP control level at which the control stops when the BCP control level decreases as illustrated in FIG. 9 (the control targets set in each record 42 of the BCP control levels "n" to "(n–m)" in FIG. 9). If the same control is included, the currently generated power is estimated while the same control as the user control is continuously executed. When the estimation value of the currently generated power is lower than the BCP target power, the central controller 400 decreases the BCP control level to "(n–m)". In contrast, when the estimation value of the currently generated power is higher than the BCP target power, the central controller 400 estimates the currently generated power by assuming that the BCP control level was decreased to "(n–(m+1))". By repeating this process, the central controller 400 decreases the currently generated power to the BCP target power or lower while the user control is continuously executed.

Figure 10:
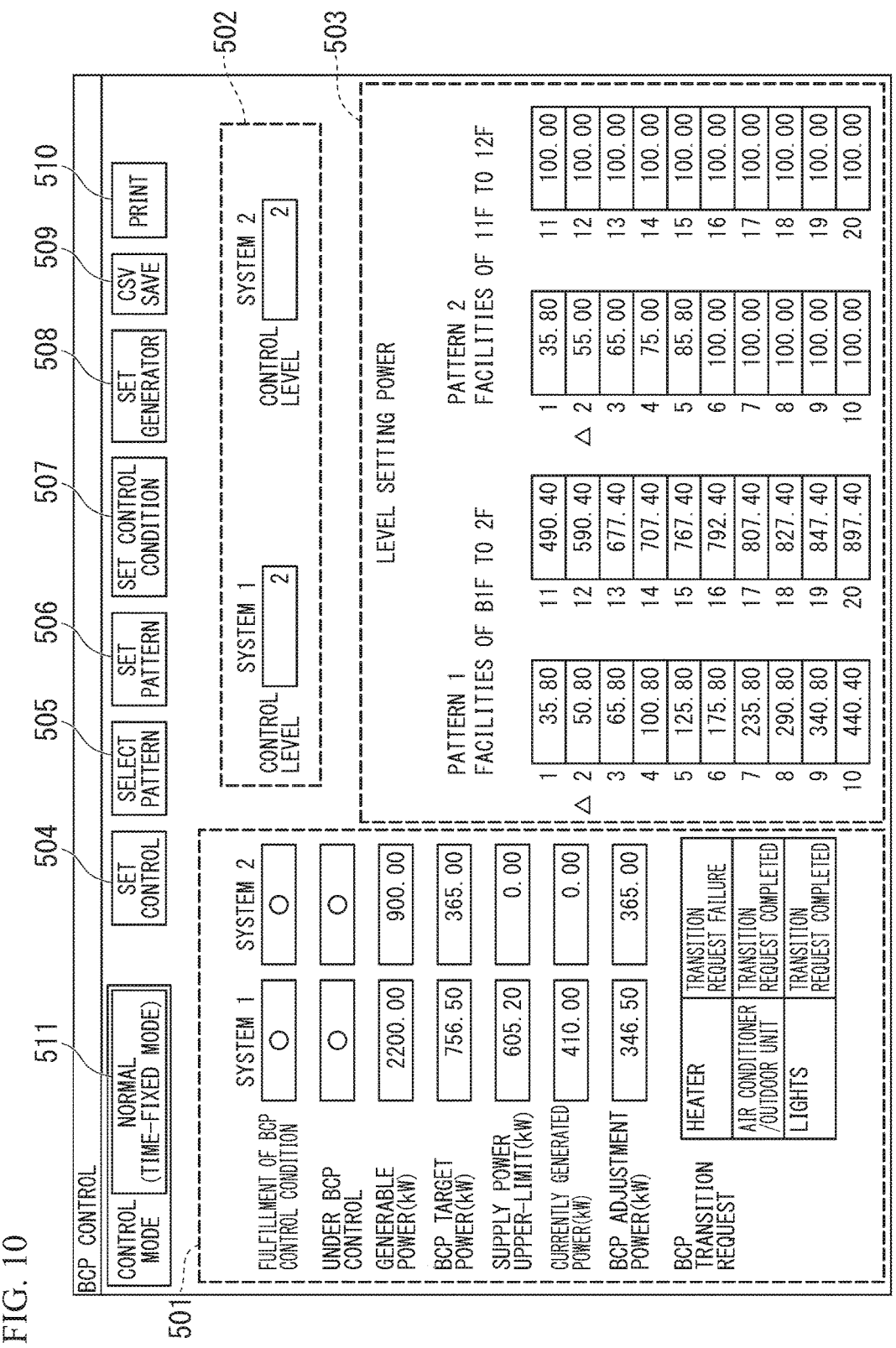
FIG. 10 is a diagram illustrating a specific example of a BCP control screen displayed on a display (402).

FIG. 10 is a diagram illustrating a specific example of the BCP control screen displayed on the display 402. The BCP control screen is a screen for displaying a control status, setting power for each priority of the load control pattern set on this screen, and the like.

A BCP control status display region 501 is a region for displaying a BCP control status. In the BCP control status display region 501, "Fulfillment of BCP control condition", "Under BCP control", "Generable power", "BCP target power", "Supply power upper-limit", "Currently generated power", "BCP adjustment power" and values of each index of "Post-BCP request" are displayed.

"Fulfillment of bcp control condition" indicates whether or not the BCP control condition is satisfied. If the BCP control condition is satisfied, an O-mark is displayed. If the BCP control condition is not satisfied, an X-mark is displayed.

"Under BCP control" indicates whether or not the BCP control is being performed. If the BCP control is being performed, an O-mark is displayed. If the BCP control is not being performed, an X-mark is displayed.

"BCP control pattern" indicates a pattern currently under control.

"Generable power" indicates a total sum of power generable from normal electric generators 101 satisfying an operable condition.

"BCP target power" indicates BCP target power that can be supplied from the electric generator 101.

"Supply power upper-limit" indicates a supply power upper-limit computed on the basis of the supply power upper-limit percentage registered in setting of the electric generator with respect to the target power.

"Currently generated power" indicates currently generated power.

"BCP adjustment power" indicates a value obtained by subtracting the currently generated power from the BCP target power.

"BCP transition request" indicates a result of a transition instruction for facilities at the time of control start and at the time of control end.

In a level display region 502, BCP control levels that are applied in each electric power system 100 are displayed. For the electric power system 100, for which a control has been interrupted because the condition was not satisfied after the start of the BCP control, a value "0" is displayed as the BCP control level, and "Interrupted" is displayed thereunder.

In a pattern setting power display region 503, a pattern number, a pattern name, and setting power for the selected BCP control pattern are displayed. The setting power of each pattern refers to a cumulative capacity. Further, when the current BCP control level is set to any one of levels "1" to "20", a predetermined symbol (black triangle in the example of FIG. 10) is displayed on the left side of the corresponding BCP control level.

A "Control setting" button 504 is a button for displaying a control setting dialog box. A "Pattern selection" button 505 is a button for displaying a pattern selection dialog box. A "Pattern setting" button 506 is a button for displaying a pattern setting dialog box. A "Control condition setting" button 507 is a button for displaying a control condition setting dialog box. A "Generator setting" button 508 is a button for displaying a generator setting dialog box. A "CSV save" button 509 is a button for displaying a CSV save dialog box. A "Print setting" button 510 is a button for displaying a print setting dialog box. In a control mode display region 511, a content of the currently executed control (such as Normal, power failure control, BCP control, or power restoration control) is displayed.

FIG. 11 is a diagram illustrating a specific example of the pattern setting dialog box displayed on the display 402. On the screen of the pattern setting dialog box, an operator may register the content of each load control pattern.

In a pattern setting display region 601, information registered on the pattern table 41 is displayed. It should be noted that entries such as Status, Setting Value, and Change Status are displayed in FIG. 11 in addition to the entries of FIG. 3.

"Level" refers to the BCP control level number. "Load Name" refers to a name of the control target point. In the entry "Status", a black circle is displayed when the control target point is to control a status (such as ON/OFF).

"Setting Value" refers to a classification of the load selected when a control target point that performs a setting value output is registered. When the classification of the load is a temperature, a black rectangle is displayed. When the classification of the load is illuminance, a black diamond is displayed.

"Capacity" refers to a capacity of the control target point. "Excluded" indicates whether or not the control target point is excluded. "Change Status" indicates a change status of a pattern selected during the control and a control output status. "Total" indicates a total sum of load capacities registered on each BCP control level.

In a pattern selection region 602, a value of the load control pattern currently displayed in the pattern setting display region 601 is displayed. An operator may change the load control pattern displayed in the pattern setting display region 601 by manipulating a button "<" or ">".

A "New Registration" button 603 is a button for displaying a pattern information setting dialog box. A "Change" button 604 is a button for displaying an information setting dialog box of the BCP control level of the selected control target point. A "Delete" button 605 is a button for deleting the registration of the selected control target point. A "Cancel" button 606 is a button for closing the dialog box.

Figure 12:
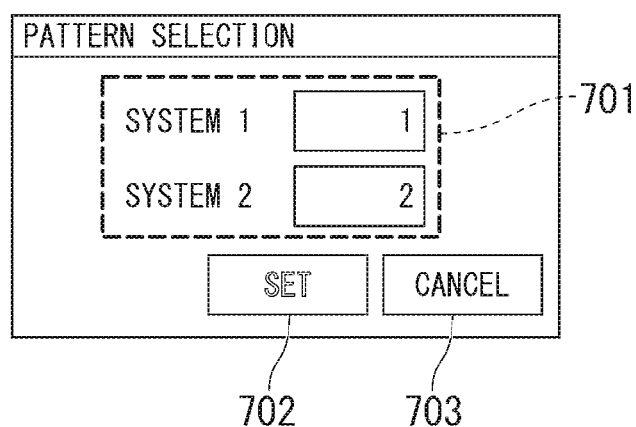
FIG. 12 is a diagram illustrating a specific example of a pattern selection dialog box displayed on the display (402).

FIG. 12 is a diagram illustrating a specific example of the pattern selection dialog box displayed on the display 402. The pattern selection dialog box is a display for allowing an operator to select the load control pattern number for each system.

In a pattern number display region 701, the load control pattern number for each system is displayed. If a portion where the number is displayed is selected, the pattern number selection dialog box is displayed. An operator may change the selected number on the pattern number selection dialog box.

A "Set" button 702 is a button for closing the pattern selection dialog box to reflect the settings. A "Cancel" button 703 is a button for discarding the settings and closing the pattern selection dialog box.

In the load control system according to at least one embodiment described above, the control operations are sequentially executed in order of priority on the basis of the load control pattern selected by an operator depending on circumstances. For this reason, it is possible to sequentially operate the loads in order of priority within a range of power generable by the electric generator 101 (private power generator). Therefore, it is possible to more efficiently use the power generated from the private power generator.

If a user control is generated in the middle of execution of the BCP control, the currently generated power is adjusted by stopping other controls while the user control is maintained, for example, even for the user control defined as a low priority control. For this reason, it is possible to efficiently use the power generated from the private power generator while the control of the load 105 desired by a user is maintained.

When a load 105 is failed, it is possible to exclude the load 105 from the control target. In addition, the BCP control is executed without including the power necessary for the excluded control in the setting power. For this reason, it is possible to divert the power allocated to the load 105 that is not normally operated to the control of other normal loads 105. Therefore, it is possible to more efficiently use the power generated from the private power generator.

When the BCP control is executed, the control is executed only for the loads 105 that have been operated before a power failure. Therefore, the power of the private power generator is not consumed for any load 105 that has not been operated originally. The load 105 that has not been operated before a power failure is highly probably unnecessary for a user at that time. For this reason, it is possible to supply the power of the private power generator only for the loads 105 more necessary for a user and more efficiently use the power generated from the private power generator.

<Modification>

A change of the content registered on the control pattern may be inhibited during the BCP control.

In the aforementioned record 42, as a specific example of the control target, lights turn-on, air conditioner turn-on, and temperature setting in the air conditioner are included. A specific example of the control target is not limited to those described above. For example, if the load 105 is an air conditioner, the following information may be set as the control target: Power-ON/OFF; Operation Type (such as Cooling, Heating, Drying, or Air Blowing); Airflow Intensity (such as Weak, Middle, or Strong); and Temperature Setting (such as 28° C. or 30° C.). For example, if the load 105 is a lighting apparatus, the following information may be set as the control target: the number of lights to be turned on out of a plurality of lights or positions thereof; and illuminance (such as Low, Middle, or High). Furthermore, control targets other than the air conditioner or the lighting apparatus may also be set.

The central controller 400 is not necessarily mounted as a single information processing unit. For example, a plurality of information processing units that can communicate with each other may cooperate to implement a function of the central controller 400. Furthermore, the central controller 400 and the central monitoring unit described above may be integrated into a single information processing unit.

The pattern table 41 of FIG. 3 is merely an example and may also be provided as a table having other values. For example, a status, a setting value, a change status may be registered on the pattern table 41 in addition to the number, the priority, the control target, the capacity, the excluded, and the total capacity. It should be noted that each value of the status, the setting value, and the change status is similar to those shown in FIG. 11 with the same name.

While some embodiments of the invention have been described and illustrated hereinbefore, it should be understood that they are only for exemplary purposes and are not to be construed as limitations. Any addition, omission, substitution, or modification may be possible without departing from the spirit or scope of the present invention. Accordingly, the invention is not to be considered as being limited by the foregoing description, and is only limited by the scope of the appended claims and equivalents thereof.

REFERENCE SIGNS LIST

10 Load control system
100 Electric power system
101 Electric generator
102 First circuit breaker
103 Second circuit breaker
104 Power board
105 Load
200 Inter-system bypass circuit breaker
300 Commercial power circuit breaker 400 Central controller
401 Input
402 Display
403 Pattern controller
404 Pattern memory
405 Communicator
406 State monitor
407 State memory
408 Load controller
409 Determiner

What is claimed is:

1. A load control apparatus comprising:
a memory that stores a plurality of patterns having a plurality of control operations that are prioritized for a plurality of loads operated by consuming electric power;
a selector configured to select one of the patterns stored in the memory; and
a load controller configured to operate the loads in an order of priority on the basis of the control operation of the selected pattern while a total sum of power consumed by the loads does not exceed a target power value representing a value based on power suppliable by an electric generator.

2. The load control apparatus according to claim 1, wherein the load controller does not execute the control operation relating to operation of the loads when the total sum exceeds the target power value.

3. The load control apparatus according to claim 1, wherein, when there is a user control which is a control for a load started by a user or operator, the load controller controls the loads such that the total sum does not exceed the target power value by stopping a part of the operation based on the control operation of the pattern regardless of the priority of the user control while execution of the user control is maintained.

4. The load control apparatus according to claim 1, wherein, when there is a load excluded from a control target, the load controller determines whether or not the total sum exceeds the target power value on the basis of the total sum that does not include power consumed by control of the load excluded from the control target.

5. The load control apparatus according to claim 1, wherein, when the loads are controlled after a power failure, the load controller does not control, regardless of the priority, a load that had not been controlled before the power failure.

6. A load control system comprising:
a) a load control apparatus comprising:
a-1) a memory that stores a plurality of patterns having a plurality of control operations that are prioritized for a plurality of loads operated by consuming electric power;
a-2) a selector configured to select one of the patterns stored in the memory; and
a-3) a load controller configured to operate the loads in an order of priority on the basis of the control operation of the selected pattern while a total sum of power consumed by the loads does not exceed a target power value representing a value based on power suppliable by an electric generator; and
b) the electric generator for supplying electric power to the plurality of loads.

* * * * *